United States Patent [19]

Grigo et al.

[11] 4,292,222

[45] Sep. 29, 1981

[54] HOMOGENEOUS THERMOPLASTIC MIXTURES OF PROPYLENE-ETHYLENE COPOLYMERS AND LIQUID, SATURATED DIORGANOPOLYSILOXANES WITHIN A CERTAIN VISCOSITY RANGE

[75] Inventors: Ulrich Grigo, Krefeld; Leo Morbitzer, Cologne; Klaus-Peter Arlt, Senden/Muenster; Rüdolf Binsack, Krefeld; Josef Merten, Korschenbroich, all of Fed. Rep. of Germany

[73] Assignee: Bayer Aktiengesellschaft, Leverkusen, Fed. Rep. of Germany

[21] Appl. No.: 119,939

[22] Filed: Feb. 8, 1980

[30] Foreign Application Priority Data

Feb. 13, 1979 [DE] Fed. Rep. of Germany ....... 2905356

[51] Int. Cl.$^3$ .................... C08L 23/10; C08L 23/04; C08L 83/04
[52] U.S. Cl. .............................. 260/29.1 SB; 525/106
[58] Field of Search .................. 525/106; 260/29.1 SB

[56] References Cited

U.S. PATENT DOCUMENTS

| | | | |
|---|---|---|---|
| 2,655,489 | 10/1953 | Lawson | 260/29.1 SB |
| 2,888,419 | 5/1959 | Safford | 260/29.1 SB |
| 2,992,201 | 7/1961 | Gober | 260/29.1 SB |
| 3,326,880 | 6/1967 | Binsberger | 525/4 |
| 3,865,897 | 2/1975 | Falender et al. | 525/106 |

FOREIGN PATENT DOCUMENTS

| | | | |
|---|---|---|---|
| 639930 | 4/1962 | Canada | 525/106 |
| 843665 | 8/1960 | United Kingdom | 525/106 |
| 1224035 | 3/1971 | United Kingdom | . |
| 1294986 | 11/1972 | United Kingdom | . |

OTHER PUBLICATIONS

Derwent Abs. 41756A/23 (SV565922), Aug. 25, 1977; "Heat Stable . . . ethylene propylene copolymer . . . and liq. ethylene:siloxane".
Derwent Abs. 32376Y/18 (SU521293), "Vulcanizing nonpolar rubber comp . . . and liquid polymethyl or polyethyl siloxane . . . ", Oct. 19, 1976.
Derwent Abs. 12230B/07 (DT2821807), "Flame resist insulating comp . . . polyolefin together with organo polysiloxane rubber . . . ", Aug. 2, 1979.
Derwent Abs. 14704V/08, "Plastics/Rubber Electrical Insul . . . Contg. an organosiloxane . . . ", (J7-4004-815), Feb. 4, 1974.
Derwent Abs. "Electric Insulator . . . "(DT2217795), Oct. 19, 1972, Celanese Corp.
Derwent Abs. "Mould for Concrete Construction . . . Polypropylene" (J78001-768), Jan. 21, 1978.
Derwent Abs. (J48028-542), Apr. 16, 1973, "Liquid Repellent Thermoplastic Mouldings-contg. Silicone Polymer & Polypropylene".
Derwent Abs. 65188W/39, "Polypropylene Comps. N-cont. Poly-dimethyl Siloxane Rubber as Elastomer Improve Properties" (S455124), 3-13-75.

*Primary Examiner*—John C. Bleutge
*Assistant Examiner*—Herbert J. Lilling
*Attorney, Agent, or Firm*—Connolly and Hutz

[57] ABSTRACT

A homogeneous thermoplastic mixture comprising (A) from 85 to 99.5% by weight of a propylene-ethylene copolymer containing from 0.5 to 15% by weight of copolymerized ethylene units and having a melt index of from 1.0 to 30 g/min at 230° C. and under a load of 5 kg; and (B) from 0.5 to 15% by weight of a saturated diorganopolysiloxane having a viscosity of from 30,000 to 80,000 Cst at 20° C.

The mixtures of the present invention are particularly suitable for the manufacture of elastic polypropylene based moulded articles which are dimensionally stable in heat.

7 Claims, No Drawings

HOMOGENEOUS THERMOPLASTIC MIXTURES OF PROPYLENE-ETHYLENE COPOLYMERS AND LIQUID, SATURATED DIORGANOPOLYSILOXANES WITHIN A CERTAIN VISCOSITY RANGE

The present invention relates to homogeneous thermoplastic mixtures of propylene-ethylene copolymers containing up to 15% by weight of ethylene units built into the copolymer, and liquid, saturated diorganopolysiloxanes, having a viscosity in the range of from 30,000 to 80,000 cSt at 20° C.

It is known from Belgian Patent No. 648,526 (corresponding to U.S. Pat. No. 3,326,880) to mix predominantly crystalline homopolymers or copolymers of monoolefinically unsaturated hydrocarbons having from 2 to 4 carbon atoms, in particular propylene, with from 0.01 to 5% by weight, based on the weight of the mixtures, of alkali metal salts of branched chain acyclic saturated monocarboxylic acids having a maximum of 12 C-atoms. The mechanical properties can be further strengthened by incorporating up to 20% by weight, based on the weight of total mixture, of rubber-like substances such as silicone rubbers in the melt of the above mentioned mixtures. Such saturated silicone rubbers have molecular weights of ca. 200,000 to 2,000,000 (see German Auslegeschrift No. 1,669,851, column 4, lines 1 to 8). According to "Chemie und Technologie der Silicone" by W. Noll, 1968, publishers Verlag Chemie, GmbH, Weinheim/Bergstrasse, page 332, Chapter entitled "Siliconkautschuk-Typen", the usual commercial silicone rubbers are mainly based on polymeric chain dimethylpolysiloxanes having molecular weights of ca. 300,000 to 700,000.

From German Auslegeschrift No. 2,430,949, inter alia, it is known to produce cross-linkable mixtures of polypropylene or copolymers of propylene and small quantities of other vinyl monomers and diorganopolysiloxane rubbers containing vinyl or allyl groups with a Williams plasticity above 0.0508 cm (according to ASTM-D-926-67).

Lastly, it has already been proposed to mix low molecular weight, liquid diorganopolysiloxanes having viscosities of up to 3000 cSt (Centistokes) at 25° C. with ethylene-propylene copolymers. When mixtures with diorganopolysiloxanes which have a viscosity of up to 100 cSt at 25° C. are extruded and cross-linked with peroxides, the moulded products obtained have a high resistance to ionisation.

It has now surprisingly been found that liquid, saturated diorganopolysiloxanes having a viscosity in the range of from 30,000 to 80,000 cSt at 20° C. exert a lasting influence on the mechanical properties of propylene-ethylene copolymers even when used in only minor quantities. The elastic properties of moulded articles produced from mixtures of propylene-ethylene copolymers and small quantities of diorganopolysiloxanes within the given viscosity range are considerably improved whilst their dimensional stability in heat and their rigidity are substantially maintained.

As the proportion of diorganopolysiloxane increases within the range of from 0.5 to 15% by weight, the permanent elongation of the moulded products, which is a measure of their elasticity, decreases substantially. It has been found particularly advantageous to add diorganopolysiloxane in quantities of 1 to 10% by weight.

Another advantage of the moulded products of propylene-ethylene copolymers and diorganopolysiloxanes produced from the mixtures according to the present invention is their improved elongation on tearing. Although the oligomeric diorganosiloxanes introduced have a cold setting point below −40° C., their dimensional stability in heat, expressed as the Vicat temperature of moulded products obtained from the mixtures according to the present invention is only slightly reduced.

In order to achieve the improvement in properties mentioned above, it is important to use diorganopolysiloxanes having a viscosity in the range of from 30,000 to 80,000 cSt, measured at 20° C. Diorganopolysiloxanes having viscosities lower than 30,000 cSt are less suitable because they are liable to exude out of the mixture in the course of processing. Very highly viscous diorganopolysiloxanes with viscosities above 80,000 cSt are also less suitable, possibly because their rate of diffusion is not sufficient to enable them to be distributed sufficiently rapidly within the polymer workpiece in the event of subjection to a mechanical stress such as elongation.

The present invention therefore provides a homogeneous thermoplastic mixture comprising (A) from 85 to 99.5% by weight, preferably from 90 to 99% by weight of a propylene-ethylene copolymer containing from 0.5 to 15% by weight, preferably from 1 to 8% by weight of copolymerised ethylene units and having a melt index of from 1.0 to 30 g/10 min at 230° C. under a load of 5 kg and (B) from 0.5 to 15% by weight, preferably from 1 to 10% by weight of a saturated diorganopolysiloxanes having a viscosity in the range of from 30,000 to 80,000 cSt at 20° C.

The diorganopolysiloxanes used may, for example, be dialkylpolysiloxanes having from 1 to 4 C-atoms in each alkyl group, diphenylpolysiloxanes and methyl-phenyl-polysiloxanes, provided, they are within the given viscosity range.

The above mentioned dialkylpolysiloxanes are particularly effective, especially dimethylpolysiloxanes.

The propylene-ethylene copolymers contained in the mixtures have a melt index (MFI) of 1.0 to 30 g/10 min at 230° C. under a load of 5 kg. The copolymerised portion of ethylene amounts to from 0.5 to 15% by weight, preferably from 1.0 to 10% by weight. The degree of crystallinity of polypropylene is generally reduced by copolymerisation with monomers such as ethylene. At the same time, the elastic properties, particularly the toughness, are generally found to be improved compared with homopolypropylene, although the structure of the copolymer plays an important part. Thus polypropylene copolymers which contain crystalline ethylene segments show less improvement in toughness than the predominantly crystalline propylene-ethylene copolymers contained in the mixtures according to the present invention, in which amorphous, rubber-like ethylene-propylene segments contain ethylene and propylene in statistical distribution.

The polypropylene copolymers to be used in the mixtures of the present invention may be prepared in known manner (see German Offenlegungsschrift No. 2,742,910) by the Ziegler Natta process, using known catalyst systems, e.g. titanium-III chloride/triethylaluminium of diethylaluminium chloride, as described below:

Polymerisation begins with the homopolymerisation of propylene to produce a crystalline polypropylene block. For the purposes of the present invention, it is preferred to use propylene-ethylene copolymers which are prepared by adding propylene as well as ethylene after the formation of the polypropylene block, so that amorphous, rubber-like ethylene-propylene segments having a substantially statistical distribution of ethylene and propylene are obtained.

When the polypropylene copolymers to be used according to the present invention are mixed with from 0.5 to 15% by weight, preferably from 1 to 10% by weight if diorganopolysiloxanes, a marked improvement in the elastic properties and especially in the permanent elongation and elongation on tearing are obtained with even small additions of diorganopolysiloxanes having viscosities within the range of from 30,000 to 80,000 cSt at 20° C.

The aforesaid viscosity range corresponds to average molecular weights, $\overline{M}_w$ (weight average) of from ca. 65,000 to 100,000.

The average molecular weights of polyorganosiloxanes suitable for use in the present invention were determined from the intrinsic viscosities of the oils, according to Barry's formula (see W. Noll, "Chemie und Technologie der Silikone", 1968 publishers Verlag Chemie GmbH, Weinheim/Bergstrasse, p. 218/219, Chapter entitled "Kettenpolymere").

In order to obtain optimum utilisation of the elasticising effect of diorganopolysiloxanes in propylene-ethylene copolymers, the diorganopolysiloxanes must be incorporated as homegeneously as possible in the copolymer. This may be achieved by either incorporating the diorganopolysiloxane at room temperature and then heating the mixture with the application of shearing forces or by incorporating it while the copolymer is being melted. The mixing temperature must be high enough to soften the synthetic material and enable a very uniform mixture to be formed. The temperature required in a kneader or extruder is generally from 170° to 270° C. Pigments, fillers, stabilisers, light-protective agents or other suitable modifying ingredients may be incorporated with the mixture if so desired.

Electronmicroscopic photographs of a cross-section through a sample may be used to determine whether the diorganopolysiloxane is homegeneously distributed in the propylene-ethylene copolymer.

Compared with pure propylene-ethylene copolymers, the mixtures of the present invention show a marked improvement in elastic properties such as permanent elongation and elongation on tearing. The mixtures of the present invention therefore open up the possibility of producing heat moulded articles containing high proportions of polyolefines, i.e. with a high dimensional stability in heat and improved elasticity. If diorganopolysiloxanes outside the given viscosity range are used, the samples are found to be substantially inferior in their mechanical properties.

EXAMPLES 1–4 and COMPARISON EXAMPLE 1

The pulverulent propylene-ethylene copolymer (PE copolymer) used in Examples 1 to 4 and comparison Example 1 contained 3% by weight of ethylene incorporated by polymerisation and had a melt index (MFI) of 15.0 g/10 min at 230° C. and 5 kg load. In measurements of torsion modulus carried out on this polypropylene copolymer according to DIN 53,445, the dynamic loss modulus was found to have a maximum at −54° C. (freezing temperature of amorphous, rubber-like ethylene-propylene segments) and another at 4° C. (freezing temperature of amorphous polypropylene content).

The dimethylpolysiloxane used had a viscosity of 50,000 cSt at room temperature and a cold setting point of ca. −50° C.

The dimethylpolysiloxane and the powder were vigorously stirred together before the mixing operation proper. The resulting mixture was introduced into a 1 liter internal kneader, model GK 4 SU of Werner+Pfleiderer,Stuttgart, which had been preheated to 170° C., and the mixture was vigorously kneaded in this apparatus for 7 minutes at a rotation speed of 100 revs/min and a ram pressure of 2.5 excess atmospheres. The temperature of the mass rose to 200°–210° C. in the process. The product obtained after kneading was rolled out into a sheet on a roller (roller temperature ca. 150° C.) and then granulated.

Test samples were produced according to DIN 53,504 (No. 3) in a digitally controlled injection moulding machine (model ES 110-60) of Engel KG, Schwertberg, Austria, at a screw speed of 130 revs/min, an injection pressure of 1075 bar and a nozzle temperature of 230° C. The test samples required for the various tests were in part mechanically removed from sample No. 3. The test results obtained in Examples 1 to 4 and comparison Example 1 are summarized in Table 1.

Examples 1 to 4 clearly demonstrate that as the quantity of oligomeric dimethylsiloxane added increases, elastic properties such as permanent elongation and elongation on tearing are greatly improved compared with those of pure polypropylene copolymer. The flow characteristics (MFI) are not substantially influenced until the proportion of dimethyl siloxane added is relatively high (Example 4) while the dimensional stability under heat (Vicat softening temperature) is only slightly lowered by the addition of dimethylsiloxanes.

The products of the present invention are therefore particularly suitable for the manufacture of elastic polypropylene based moulded articles which are dimensionally stable in heat.

TABLE 1

Experimental Results

| | Measuring unit | Ex. 1 | Ex. 2 | Ex. 3 | Ex. 4 | Comparison Ex. 1 |
|---|---|---|---|---|---|---|
| PE Copolymer | Parts by weight | 99 | 97.5 | 95 | 92.5 | 100 |
| Dimethylpolysiloxane | parts by weight | 1 | 2.5 | 5 | 7.5 | 0 |
| Melt index[1] (MFI) | g/10 min | 17.2 | 18.1 | 19.5 | 27.4 | 15 |
| Elongation on tearing[2] | % | 245 | 310 | 395 | 615 | 170 |
| Vicat softening temperature[3] | °C. | 144 | 144 | 143 | 139 | 145 |
| Permanent elongation[4] | % | 83 | 82 | 80 | 77 | 86 |

[1]Determined according to DIN 53 735
[2]Determined according to DIN 53 455
[3]Determined according to DIN 53 460
Method of measurement: Elongation of a standard shoulder rod to double its length (= 100% elongation) at a rate of 100 mm/min; 100% elongation maintained for one minute; the permanent elongation is measured one minute after removal of the load.

The following comparison Examples 2 and 3 show that mixtures of PE copolymer with 3% by weight ethylene incorporated by polymerisation and diorganopolysiloxanes which are outside the claimed viscosity range give rise to moulded articles with substantially inferior mechanical properties to those of the present invention. See Table 2.

TABLE 2

| | Measuring unit | Example 3 | Comparison Example 2 | Comparison Example 3 |
|---|---|---|---|---|
| PE copolymer | parts by weight | 95 | 95 | 95 |
| Dimethylpolysiloxane | parts by weight | 5 | 5 | 5 |
| Viscosity of dimethylpolysiloxane | cSt at 20° C. | 50 000 | 25 000 | 100 000 |
| Melt index[1] (MFI) | g/10 min | 19.5 | 25.4 | 18.2 |
| Elongation on tearing[2] | % | 395 | 185 | 300 |
| Vicat softening temperature[3] | °C. | 143 | 141 | 140 |
| Permanent elongation[4] | % | 80 | 84 | 82 |

[1]Determined according to DIN 53 735
[2]Determined according to DIN 53 455
[3]Determined according to DIN 53 460
[4]Method of measurement: Elongation of a standard shoulder rod to double its length (= 100% elongation) at a rate of 100 mm/min; 100% elongation maintained for one minute; the permanent elongation is measured one minute after removal of the load.

EXAMPLES 5 to 7 and COMPARISON EXAMPLE 4

The PE copolymer used in Examples 5 to 7 and in Comparison Example 4 contained 7% by weight of ethylene units and had a melt index (MFI) of 9.4 g/min at 230° C. under a load of 5 kg. The polysiloxane used was the dimethylpolysiloxane used in Examples 1 to 4. The samples were produced under the conditions indicated in Examples 1 to 4, and the results of the tests are shown in Table 3. In this PE copolymer, the elastic properties such as elongation on tearing, and permanent elongation are again substantially improved by the addition of polydimethylsiloxane.

TABLE 3

| | Measuring unit | Ex. 5 | Ex. 6 | Ex. 7 | Comparison Ex. 4 |
|---|---|---|---|---|---|
| PE copolymer | Parts by weight | 97.5 | 95 | 92.5 | 100 |
| Proportion of E in PE copolymer | % | 7 | 7 | 7 | 7 |
| Dimethylpolysiloxane | parts by weight | 2.5 | 5 | 7.5 | 0 |
| Melt index[1] (MFI) | g/10 min | 11.7 | 14.3 | 17.2 | 9.4 |
| Elongation on tearing[2] | % | 270 | 395 | 580 | 150 |
| Vicat softening temperature[3] | °C. | 137 | 135 | 129 | 138 |
| Permanent elongation[4] | % | 81 | 78 | 75 | 84 |

[1]Determined according to DIN 53 735
[2]Determined according to DIN 53 455
[3]Determined according to DIN 53 460
[4]Method of measurement: Elongation of a standard shoulder rod to double its length (= 100% elongation) at a rate of 100 mm/min; 100% elongation maintained for one minute; the permanent elongation is measured one minute after removal of the load.

We claim:
1. A homogeneous thermoplastic mixture comprising
   (A) from 85 to 99.5% by weight of a propylene-ethylene copolymer containing from 0.5 to 15% by weight of copolymerised ethylene units and having a melt index of from 1.0 to 30 g/min at 230° C. and under a load of 5 kg; and
   (B) from 0.5 to 15% by weight of a saturated diorganopolysiloxane having a viscosity of from 30,000 to 80,000 Cst at 20° C.
2. A homogeneous thermoplastic mixture as claimed in claim 1 wherein component (A) is present in an amount of from 90 to 99% by weight and component (B) is present in an amount of from 1 to 10% by weight.
3. A homogeneous thermoplastic mixture as claimed in claim 1 wherein the propylene-ethylene copolymer contains amorphous rubber-like ethylene-propylene segments which under temperature dependent measurements of torsion moduli according to DIN 53 445 produce maxima of dynamic loss modulus G" in the range of from −30° to 60° C.
4. A homogeneous thermoplastic mixture as claimed in claim 1 wherein the diorganopolysiloxane is a dialkylpolysiloxane having from 1 to 4 carbon atoms in each alkyl group, a diphenylpolysiloxane or a methylphenylpolysiloxane.
5. A homogeneous thermoplastic mixture as claimed in claim 4 wherein the dialkylpolysiloxane is dimethylpolysiloxane.
6. A homogeneous thermoplastic mixture as claimed in claim 1 wherein the propylene-ethylene copolymer contains from 1 to 10% by weight of copolymerised units of ethylene.
7. Heat moulded articles prepared from a homogeneous thermoplastic mixture as claimed in claim 1.

* * * * *